Patented Jan. 9, 1940

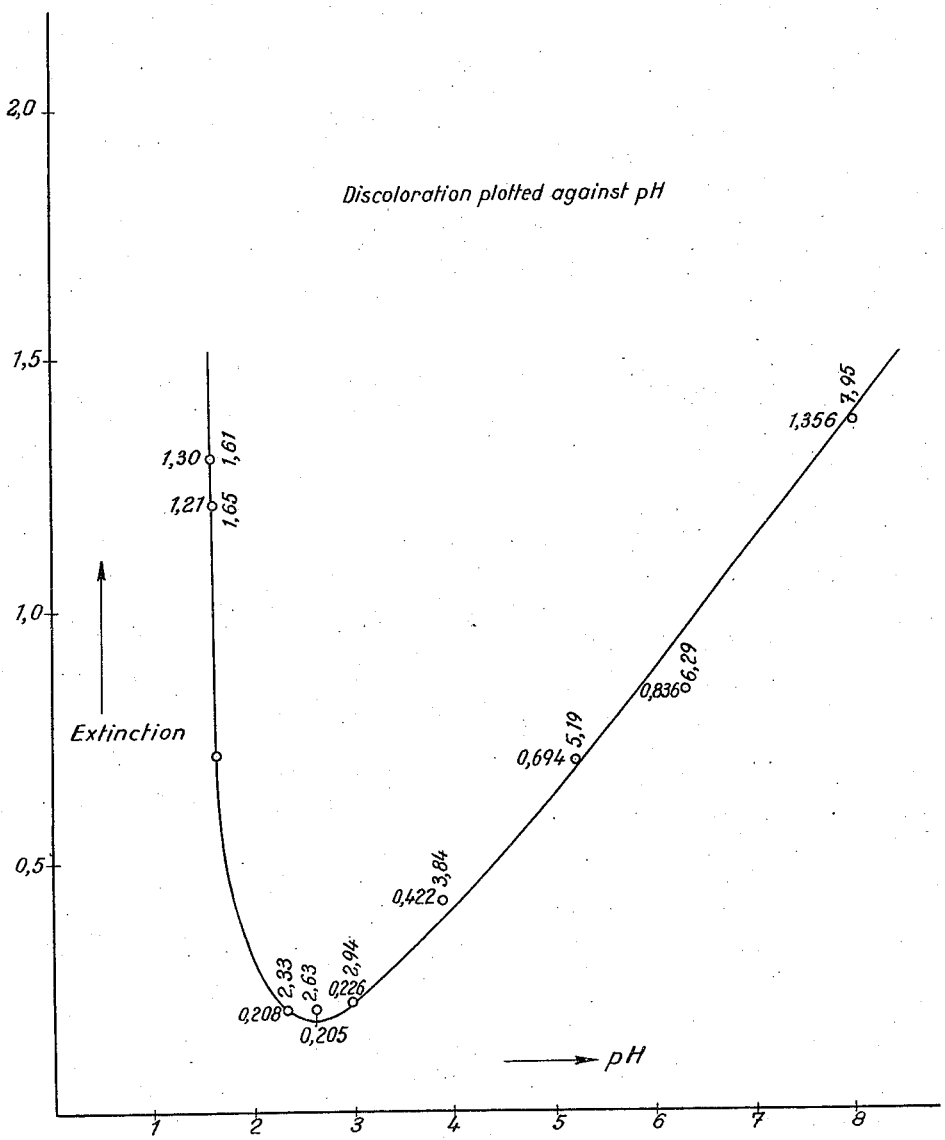

2,186,075

UNITED STATES PATENT OFFICE 2,186,075

PROCESS OF MANUFACTURING DEXTROSE-CONTAINING SUGAR PRODUCTS FROM CARBOHYDRATES BY ACID HYDROLYSIS

Waldemar Kröner and Heinz Kothe, Berlin, Germany

Application June 14, 1938, Serial No. 213,590
In Germany June 28, 1937

4 Claims. (Cl. 127—36)

Our invention relates to a process of manufacturing dextrose-containing sugar products from carbohydrates, such as starch, by acid hydrolysis.

It is an object of our invention to provide an improved process of the kind referred to, in which the liquor resulting from the process is not discolored at all, or the discoloration is a minimum.

To this end, we perform all high-temperature operations at an acidity of pH=2.3 to 3.

In the usual technical hydrolysis of starch and other hydrocarbons with acids, and in similar processes for manufacturing dextrose-containing sugar products from such carbohydrates, which is performed at acidities ranging from pH=1.5 to pH=1.8, the resulting liquor is rather dark in color, and this is not desirable for its further treatment. To reduce the discoloration, the thin liquor resulting from the hydrolysis is purified by treatment with activated carbon, bone char, or other decolorizing agents. The liquor concentrate obtained by evaporating the decolorized, neutralized, and filtered thin liquor also shows discoloration, although the acidity employed is much lower, being about pH=4.5, and requires a similar purification and decolorization treatment.

We have found that the discoloration of the liquors is a function of their pH values during their production and treatment, and is a minimum within the range of pH=2.3 to pH=3. The pH values obviously undergo small variations with various initial materials, and various operating conditions, and such small variations are still within the scope of our invention. It is believed, however, that the variations of the pH values at which discoloration is a minimum, are not of the order of several tenth of pH units, even if different initial materials are used, since the formation of the discoloring substance is obviously an equilibrium action which can hardly be influenced.

By keeping the pH value within the said limits, discoloration is much reduced, or even eliminated altogether, during all operations performed at high temperature.

In the accompanying drawing discoloration is plotted against pH. The results were obtained by heating 40% glucose solutions of various hydrogen ions concentrations to 130° during 30 minutes. The extinctions of the solutions, after they had been cooled to room temperature, were determined, with an adjusted measuring pH=4.9, by means of a Pulfrich photometer manufactured by Zeiss, with filter No. 3, centre of gravity 430. The term "extinction" could very well be expressed by the term "coefficient of extinction" and is determined by the capacity of transmitting light D of a solution, that is to say, by the ratio of the amount of light transmitted by the solution to the amount of light sent into the solution. It is, therefore, an expression of the percentage of the transmitted amount of light referred to the amount of light sent in. The negative logarithm of this capacity for transmitting light D is called extinction E. The value of extinction E for a layer having a thickness of one centimeter may also be designated as the coefficient of extinction K $$K = \frac{-\log D}{s}$$

The expression extinctions, therefore, may have substituted therefor the expression "coefficient of extinction".

By our process, it is possible to produce a priori a thin liquor of high purity in the saccharification of starch, and to concentrate this immediately, i. e., without previous neutralization, filtration, and decoloration. The entire process is much simplified, and its cost is reduced in proportion. In many cases, decoloration will not be required at all but where it is necessary the consumption of decolorizing agent is much reduced. In our process, the thin liquor, with pH=2.3 to 3, can be concentrated in the container in which it is produced, and is then neutralized and filtered in the usual way.

On account of the comparatively low acidity, the containers are attacked by the acid to a lesser degree, and this is another advantage of our invention, as the life of the containers is prolonged.

On the other hand, the lower acidity requires longer duration of the treatment in the converter if the operations are performed at the usual temperatures. By operating at higher temperatures, i. e., at 150 or 160°, the periods of treatment are reduced to their normal duration. Obviously, the higher temperatures involve higher pressures, and therefore containers must be so strong as to stand such pressures. Preferably, agitators or other mixing devices are arranged in the containers for churning the charge so that the pH value is uniform throughout.

At the same time as the reduced discoloration effected by our process, the accompanying substances—whose influence on the discoloration of the liquor has not yet been ascertained— undergo less decomposition than in solutions of higher acidity.

It has been found that discoloration is quite slight at the beginning of saccharification, and increases only as the saccharification proceeds. Therefore, our process can be performed by beginning with the usual pH values of 1.5 to 1.8, and gradually increasing to the range of 2.3 to 3, according to our invention. This causes a further shortening of the time required for the treatment.

It is known that considerable quantities of phosphoric acid are liberated during the hydrolysis, and this must be considered by regulating the pH values.

Our invention can be used to advantage in all industries treating acid glucose solutions, or starch syrups, for instance, in the manufacture of sweets, fruit syrups, invert sugars, and, generally, in all ways of producing sugar by acid hydrolysis of carbohydrates, including cellulose.

We claim:

1. The process of manufacturing dextrose-containing sugar products from carbohydrates by acid hydrolysis, comprising performing all high-temperature operations at an acidity substantially within the range of pH=2.3 to 3.

2. The process of manufacturing dextrose-containing sugar products from carbohydrates by acid hydrolysis, comprising performing all high-temperature operations at an acidity substantially within the range of pH=2.3 to 3, immediately concentrating the thin liquor, and neutralizing and filtering the concentrate.

3. The process of manufacturing dextrose-containing sugar products from carbohydrates by acid hydrolysis, comprising performing all high-temperature operations above 150° and at the corresponding pressure, and at an acidity substantially within the range of pH=2.3 to 3.

4. The process of manufacturing dextrose-containing sugar products from carbohydrates by acid hydrolysis, comprising performing all high-temperature operations at progressively decreasing acidity down to the final range of pH substantially equal to 2.3 to 3.

WALDEMAR KRÖNER.
HEINZ KOTHE.